(12) United States Patent
Boden et al.

(10) Patent No.: US 6,717,949 B1
(45) Date of Patent: Apr. 6, 2004

(54) SYSTEM AND METHOD FOR IP NETWORK ADDRESS TRANSLATION USING SELECTIVE MASQUERADE

(75) Inventors: Edward B. Boden, Vestal, NY (US); Wesley A. Brzozowski, Endicott, NY (US); Franklin A. Gruber, Vestal, NY (US); Donald A. Palermo, Johnson City, NY (US); Michael D. Williams, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/144,247

(22) Filed: Aug. 31, 1998

(51) Int. Cl.7 ............................................... H04L 12/28
(52) U.S. Cl. ...................................... 370/401; 370/467
(58) Field of Search ............................... 370/401, 389, 370/392, 475, 474, 400, 466, 467; 709/245, 249

(56) References Cited

U.S. PATENT DOCUMENTS

| | | | |
|---|---|---|---|
| 5,524,227 A | 6/1996 | Cuthbertson et al. | 395/412 |
| 5,550,984 A | 8/1996 | Gelb | 395/200.17 |
| 5,600,644 A | 2/1997 | Chang et al. | 370/404 |
| 5,621,727 A | 4/1997 | Vaudreuil | 370/60 |
| 5,636,216 A | 6/1997 | Fox et al. | 370/402 |
| 5,651,002 A | 7/1997 | Van Seters et al. | 370/392 |
| 6,058,106 A * | 5/2000 | Cudak et al. | 370/313 |
| 6,058,431 A * | 5/2000 | Srisuresh et al. | 709/245 |
| 6,128,298 A * | 10/2000 | Wootton et al. | 370/392 |
| 6,226,751 B1 * | 5/2001 | Arrow et al. | 713/201 |
| 6,243,383 B1 * | 6/2001 | Li et al. | 370/395 |
| 6,266,707 B1 * | 7/2001 | Boden et al. | 709/245 |
| 6,353,614 B1 * | 3/2002 | Borella et al. | 370/389 |

FOREIGN PATENT DOCUMENTS

| | | | |
|---|---|---|---|
| JP | 09-205457 | 8/1997 | |
| WO | WO97/05727 | 2/1997 | H04L/29/06 |

OTHER PUBLICATIONS

Secure Computing, SecureZone 1.0, Mar. 1998, Secure Computing Corporation, p. 7.*
Lodin, S. W. et al. *Firewalls fend off invasions from the Net*, IEEE Spectrum, v. 35, n. 2, Feb. 98, pp. 26–34.

* cited by examiner

*Primary Examiner*—Melvin Marcelo
*Assistant Examiner*—Ron Abelson
(74) *Attorney, Agent, or Firm*—Shelley M. Beckstrand

(57) ABSTRACT

An address management system and method. ADDRESS statements and HIDE rule statements are processed to generate a file of masquerade rules for associating subsets of internal addresses among a plurality of public addresses. Responsive to these masquerade rules, network address translation is performed for incoming and outgoing IP datagrams. IP Network Address Translation (NAT) and IP Filtering functions provide firewall-type capability to a gateway system, such as the IBM AS/400 system. A customer's system administrator specifies specific NAT and Filtering rules (via the AS/400 Operational Navigator GUI). A type of NAT, called masquerade NAT, defines a many-to-one mapping in such a way as to allow the 'many' to specify subsets of IP addresses. This allows traffic separation, which improves throughput to and from external networks (e.g. the Internet), and also improves flexibility in IP address management.

13 Claims, 2 Drawing Sheets

SYSTEM AND METHOD FOR IP NETWORK ADDRESS TRANSLATION USING SELECTIVE MASQUERADE

CROSS REFERENCES TO RELATED APPLICATIONS

U.S. patent applications Ser. No. 09/135,102 filed Aug. 17, 1998, now U.S. Pat. No. 6,182,228, entitled "System and Method for Very Fast IP Packet Filtering", Ser. No. 09/135,148 filed Aug. 17, 1998, now U.S. Pat. No. 6,266,707, entitled "System and Method for IP Network Address Translation and IP Filtering With Dynamic Address Resolution" and Ser. No. 09/135,253 filed Aug. 17, 1998 now U.S. Pat. No. 6,272,518, entitled "System and Method for Porting a Multithreaded Program to a Job Model", are assigned to the same assignee hereof and contain subject matter related, in certain respect, to the subject matter of the present application. The above identified patent applications are incorporated herein by reference.

BACKGROUND OF THE INVENTION

1. Technical Field of the Invention

This invention pertains to network address translation and IP filtering. More specifically, it relates to selective masquerading of internal IP addresses among a plurality of public IP address.

2. Background Art

IP Network Address Translation (NAT) and IP Filtering functions provide firewall-type capability to an Internet gateway system.

Network Address Translation (NAT) is done various ways. Among the known ways is masquerade NAT, in which IP addresses in IP packets are changed as the packets flow out of and into a masquerading system. The masquerading system is typically on the boundary between an organization's private networks and public networks, such as the Internet. The main benefits to these organizations of these address changes are:

1. Systems on the private network are free to use any subset of the IP address space, any IP class, superclass, subclass, or designated private IP addresses. This provides great flexibility, freedom, and control to the organization in assigning IP addresses and designing its internal network.
2. The IP addresses of private systems, the network and subnet architecture are kept hidden. The addresses do not appear on Internet IP packets. Improved security is the result.

Therefore, masquerade NAT is widely used by industry, government and other organizations today.

Masquerade NAT is a form of NAT defined by a many-to-one mapping of an organization's internal addresses to a single, public IP address. There is a need in the art to remove this restriction to a single address; to allow a system administrator to selectively designate subsets of internal IP addresses to be masqueraded, with each subset mapped to a different, single, public IP address; and improve management of internal IP addresses by allowing multiple network interfaces or masquerading systems to be used for load balancing.

It is an object of the invention to provide an improved masquerade NAT capability for gateway systems.

It is a further object of the invention to provide a selective masquerade NAT system capability, whereby subsets of internal IP addresses may be selectively masqueraded among a plurality of public IP addresses.

SUMMARY OF THE INVENTION

An address management system and method. ADDRESS statements and HIDE rule statements are processed to generate a file of masquerade rules for associating subsets of internal addresses among a plurality of public addresses. Responsive to these masquerade rules, network address translation is performed for incoming and outgoing IP datagrams.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, IP Network Address Translation (NAT) and IP Filtering functions provide firewall-type capability to a gateway system, such as the IBM AS/400 system. This is accomplished by providing means for a customer's system administrator to specify specific NAT and Filtering rules (via the AS/400 Operational Navigator GUI). A type of NAT, called masquerade NAT, defines a many-to-one mapping. Other vendors have implemented the 'many' side of the mapping as 'all'. The problem solved by this invention is: how to allow masquerade NAT to function as many-to-one, but allow the 'many' to specify subsets of IP addresses? This is useful because it allows traffic separation, which improves throughput to and from external networks (e.g. the Internet). It also allows much greater flexibility in IP address management, a common source of difficulty.

Figure 1:
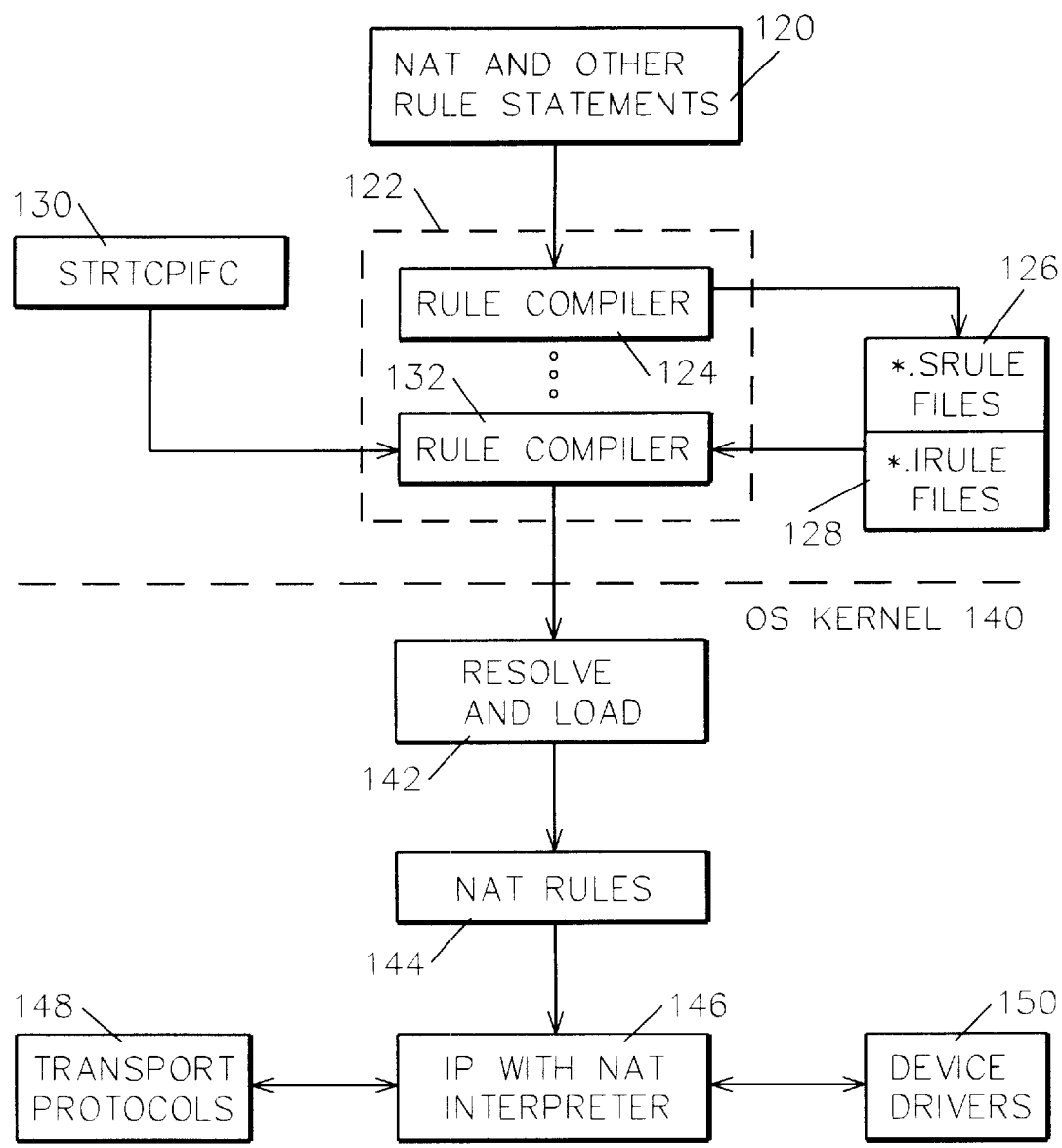
FIG. 1 is a high level system flow diagram illustrating logical relationships and data flow among key elements of a preferred embodiment of the invention.

Referring to FIG. 1, key elements of the invention are illustrated with the logical relationships and data flow among them. All depicted function is part of the operating system (OS) of a gateway system, such as the IBM AS/400.

This invention is concerned with the translation of HIDE statements to binary representation, and the interpretation of these masquerade rules as IP datagrams flow through the OS kernel. The NAT (and other rule) statements 120 are processed by rule compiler 122. An output of a first invocation 124 of rule compiler 122 is two sets of files, s-rule files 126 and i-rule files 128. These contain the binary form of rules 120 in image format (i-rule 126) or retain some symbolic information (s-rule 128). An 'i' or 's' rule file is generated for each physical interface for which there are rules. A device driver 150 represents an OS kernel 140 code interface to such a physical interface (not shown). Later, when the interface is started (via start CP interface STRTCPIFC command processing), a second invocation 132 of rule compiler 132 completes resolution of s-rule files, and in step 142 loads resolved i-rules 126 and s-rules 128 to NAT rules file 144 in OS kernel 140.

Binary masquerade rules 144 are now ready to be used by NAT interpreter 146 as IP datagrams enter and leave the system via the IOP (Input/Output Processor, by way of device drivers 150). Transport protocols 148 are accessed by interpreter 146 in the course of processing datagrams.

Table 1 shows the HIDE rule statements 120 as entered by the system administrator (a.k.a. customer) and seen by the rule compiler 122. The words in all upper-case are keywords. The ADDRESS statements of lines 1–5 are used to define sets of IP addresses, specify the type, and associate the set of IP addresses with a name. For example, ADDRESS statement 1 in Table 1 defines as 'Lan1' all addresses in the 121.56.3.* subnet, and declares them as TRUSTED. ADDRESS statement 2 defines 3 addresses which are within this subnet. This illustrates the ability to define separate IP groups, which are later associated with different masquerade rules. ADDRESS statement 3 shows the third way in which multiple addresses may be specified—by a range. This is necessary because the customer does not want the entire 121.56.4.* (which is equivalent to the range 121.56.4.1 to 121.56.4.255) subnet to be treated the same. Of course, it is also possible to specify a single IP address in an ADDRESS statement (not shown).

The HIDE statement 7 specifies a masquerade rule that will cause all 'Lan1' addresses to be hidden (translated) behind 87.30.104.6 (publicaddress2). The first HIDE statement (statement 6 in the Table 1) hides the 3 servers in servergroup1 (see ADDRESS statement 2) behind a different global address publicaddress1. Thus the server traffic is isolated, even though all 3 servers have IP addresses within the subnet of Lan1. The normal convention applies to an address set named in HIDE statements—they must have been defined in some prior ADDRESS statement.

TABLE 1

ADDRESS and HIDE Statements

1. ADDRESS Lan1 IP = 121.56.3.* TYPE=TRUSTED
2. ADDRESS servergroup1 IP = {121.56.3.17, 121.56.3.37, 121.56.3.101} TYPE=TRUSTED
3. ADDRESS Lan2subset1 IP = {121.56.4.14 TO 121.56.4.80} TYPE = TRUSTED
4. ADDRESS publicaddress1 IP = 87.30.104.5 TYPE=BORDER
5. ADDRESS publicaddress2 IP = 87.30.104.6 TYPE=BORDER
6. HIDE servergroup1 BEHIND publicaddress1
7. HIDE Lan1 BEHIND publicaddress2

Figure 2:
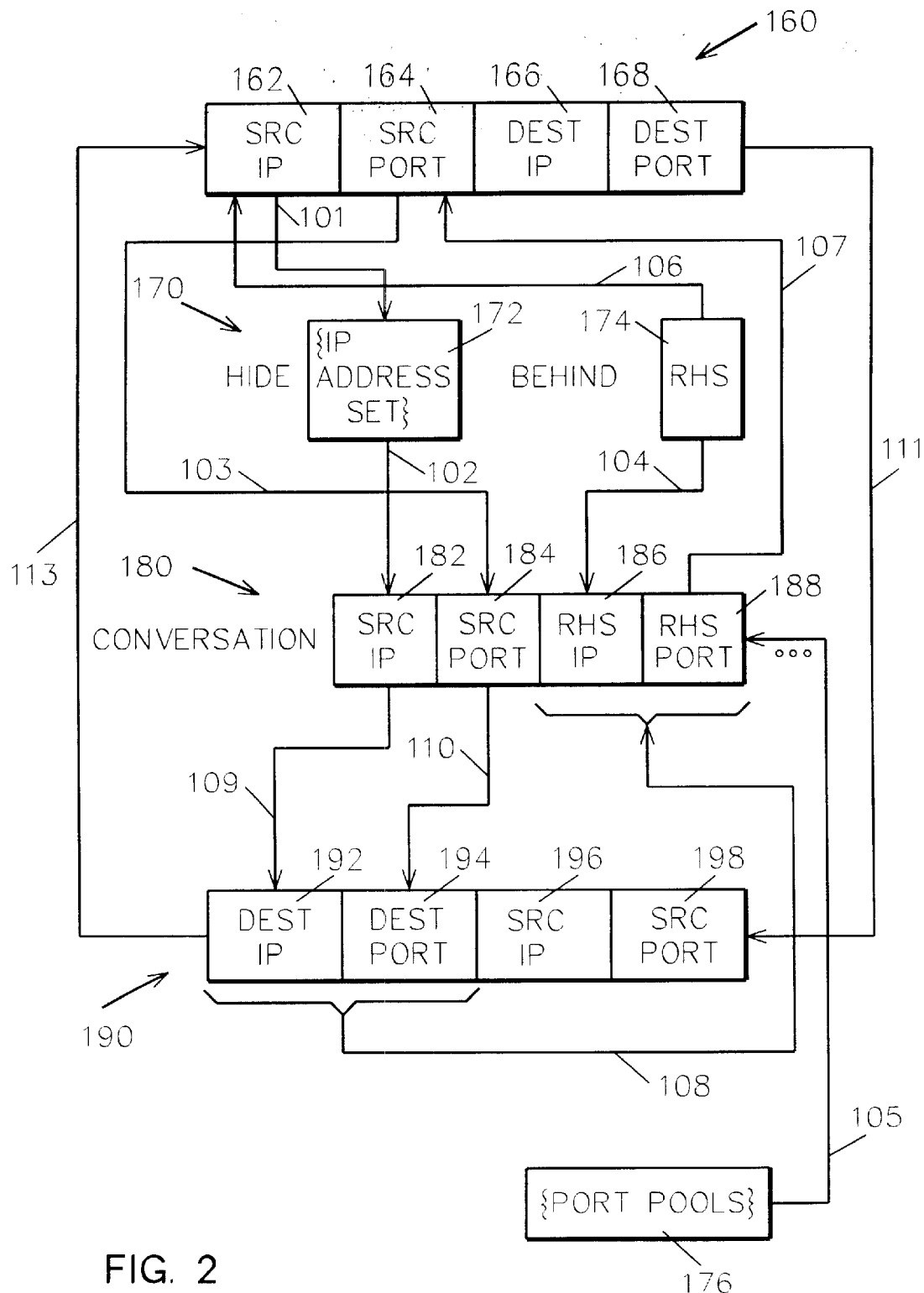
FIG. 2 is a diagram illustrating masquerade NAT functions during processing of IP datagrams.

Referring to FIG. 2, masquerade NAT functions during the processing of IP datagrams 160 as follows. The logical steps which comprise masquerade NAT are in two groups. The first group occurs when an IP datagram 160 is first seen that matches a HIDE statement 170. A match occurs when the source IP address 162 in datagram 160 is equal to one of the IP addresses in the HIDE left-hand-side (lhs) (which is the set 172 of addresses to the left of the BEHIND keyword). This is step 101 in the figure. This match causes a 'conversation' 180 to be created (steps 102–105). Essentially, one conversation 180 is created for each TCP session or UDP datagram that requires special handling (see below). Each conversation 180 has a unique right-hand-side (rhs) port 188 selected for it, from a pool 176 of port numbers (1 pool each for TCP, UDP) for use by masquerade NAT. Once created, later matching of outbound datagrams 190 is done against the conversation 180, rather than the binary hide rule (see the pseudo-code, below).

The main purpose of conversation 180 is to permit unique matching of response (inbound) datagrams 160, based on the rhs port number 188. Hence, an important characteristic of masquerade NAT (regarded as a security feature), is that traffic must initiate from an internal (TRUSTED) IP address.

Once a conversation 180 is established, address translation can be done (steps 106, 107). The source IP address 162 and port 164 are changed to the conversation's rhs IP address 186, 174 and port 188. Checksum and handling of special traffic is done (ICMP, FTP—all, not shown in figure), and the datagram 160 is set on its way. The steps for inbound masquerade NAT are simpler, since the conversation must have been established. The destination IP address 192 and port 194 are tested against conversations 180 until a conversation 180 is found that matches (has equal rhs IP address 186 and port number 188) (step 108). Then the destination IP address 192 and port 194 are changed (translated) into the conversation's lhs IP address 182 and port 184, respectively. (Checksum and special traffic handling is then done—not shown in figure.)

TABLE 2

IP Datagram Traffic Logical Steps

Inbound:

| | |
|---|---|
| 101. | if src ip 162 is in ip address set 172... |
| 102. | set up conversation 180, copy in src ip 182, |
| 103. | copy src port 164 to conversation 180, |
| 104. | copy rhs 174 to conversation 180, 186, |
| 105. | get port 188 from right pool 176, copy to conversation 180, |
| 106. | translate src ip 162 to rhs 174, |
| 107. | change src port 164 to rhs port 174. |

Outbound:

| | |
|---|---|
| 108. | if dest ip 192 & dest port 194 match rhs ip 186 & rhs port 188... |
| 109. | translate dest ip 192 to conversation src ip 182, |
| 110. | translate dest port 194 to conversation src port 184. |

A key aspect of this embodiment of the invention lies in step 101—the outbound datagram source IP address is compared to either a list of addresses, a subnet mask, or a range of addresses. So, the broad result achieved is that, a) the internal (TRUSTED) addresses never appear in IP datagrams leaving the masquerade NAT system (which provides security and IP address isolation advantages), b) the many-to-one NAT means only a single public address is 'consumed' (a resource of increasing rarity) while allowing many internal systems to communicate to external systems, and c) the entire process is completely invisible to external systems (no changes or configuration necessary other than to the NAT system).

In accordance with the preferred embodiment of the invention, the method steps include:
1. Processing ADDRESS & HIDE rule statements 120 to generate binary form 144.
2. Performing NAT 146 with the binary masquerade rules for each IP datagram 160, 190.

Tables 3 and 4 are pseudo-code (C++—like syntax) descriptions of these functional steps.

TABLE 3

Processing ADDRESS & HIDE statements

```
while ( more rule statements exist in file ) {
    if ( rule statement is an ADDRESS statement ) {
        create new address-entry with the address name;
        if (address is subnet)
            add address and subnet mask to address-entry;
        else it (address list) for (each address)
            add address to address-entry;
        else if (address range)
            add lower bound and upper bound to address-entry;
        else if (single address)
            add address to address-entry;
        {
    else if ( rule statement is a HIDE statement ) {
        create hide-entry;
        find named lhs address-entry;
        if (not found) { generate syntax error; continue; }
```

TABLE 3-continued

Processing ADDRESS & HIDE statements

```
        add lhs address-entry to hide-entry;
        find named rhs address-entry;
        if (not found) { generate syntax error; continue; }
        add rhs address-entry to hide-entry;
        }
   else { /* process other statements */ }
   } // while( )
for ( each hide-entry in symbol table ) {
   for ( each lhs address-entry ) {
      generate binary form of address-entry;
      }
   generate binary form of hide-entry rhs;
   }
```

TABLE 4

Performing NAT

```
for ( each IP datagram ) {
   if (outbound) {
      find matching conversation based on datagram.sourceip
         and datagram.sourceport;
      if (conversation found)
         translate datagram.sourceip and datagram.sourceport;
         if (datagram is ICMP or FTP) handle special case;
         compute checksum;
         {
      else { // conversation not found
         find hide-rule that matches, checking multiple IP
            addresses in each hide-rule;
         if (hide-rule found)
            create conversation;
            translate datagram.sourceip and
datagram. sourceport;
            if (datagram is ICMP or FTP) handle special case;
            compute checksum;
            }
         }
      else { // datagram is inbound
         find matching conversation.rhs based on
datagram.destip and datagram.destport;
         if ( conversation found ) {
            translate datagram.destip and datagram.destport;
            if (datagram is ICMP or FTP) handle special case;
            compute checksum;
         }
      }
      send datagram;
      }
```

Advantages Over the Prior Art

It is an advantage of the system and method of the preferred embodiment of this invention that there is provided an improved masquerade NAT capability for gateway systems.

It is a further advantage that there is provided a selective masquerade NAT system capability, whereby subsets of internal IP addresses may be selectively masqueraded among a plurality of public IP addresses.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. An address management method, comprising the steps of:
   selectively masquerading subsets of two or more private addresses among a plurality of public addresses associated with a single gateway system in accordance with a plurality of masquerade rules; and
   processing at said gateway system incoming and outgoing datagrams with respect to said masquerade rules.

2. An address management method, comprising the steps of:
   associating a plurality of subsets of private addresses with two or more public names, each said subset including two or more private addresses;
   specifying a plurality of masquerade rules for hiding said subsets of addresses behind said public names associated with a single gateway system; and
   processing at said gateway system datagrams with respect to said masquerade rules.

3. An address management method, comprising the steps of:
   processing ADDRESS statements and HIDE rule statements to generate a file of masquerade rules for associating subsets of internal addresses, each said subset including a plurality of private addresses, among a plurality of public addresses on a single physical interface; and
   responsive to said masquerade rules, performing network address translation for incoming and outgoing IP datagrams.

4. The address management method of claim 3 wherein said ADDRESS statements include a public address name and one or more associated private addresses and wherein said HIDE statements include a left hand side (lhs) address-entry and a right hand side (rhs) address-entry, said processing step comprising the steps of:
   for each ADDRESS statement, creating a new address-entry with said public address name and said associated private addresses in a rules file; and
   for each HIDE statement, creating a hide-entry including said rhs address-entry and said lhs address-entry in a symbol file, said rhs address-entry being a public address name and said lhs address entry being a set of private addresses.

5. The address management method of claim 4, each said datagram including a source address and a destination address, said performing step comprising the steps of:
   selectively creating a conversation or finding a conversation, said conversation including a source address and an associated rhs address-entry;
   said finding step including matching the source address of said datagram with the source address of said conversation;
   said creating step including locating a hide-entry with a source address matching the source address of said datagram; and
   translating said datagram source address to said rhs address-entry.

6. An address management method, comprising the steps of:

processing ADDRESS statements and HIDE rule statements to generate a file of masquerade rules; said ADDRESS statements including an address name and one or more associated addresses and said HIDE statements including a left hand side (lhs) address-entry and a right hand side (rhs) address-entry; said rhs address-entry being a public address name and said lhs address entry being a set of private addresses; and responsive to said masquerade rules, performing network address translation for each IP datagram;

said processing step comprising the steps of:
for each ADDRESS statement, creating a new address-entry with said public address name and said associated private addresses in a rules file; and
for each HIDE statement, creating a hide-entry including said rhs address-entry and said lhs address-entry in a symbol file;

each said datagram including a source address, a source port, a destination address and a destination port;

with respect to outbound datgrams, said performing step comprising the steps of:
selectively creating a conversation or finding a conversation, said conversation including a source address, a source port and an associated rhs address-entry and rhs port;
said finding step including matching the source address and source port of said datagram with the source address and source port of said conversation;
said creating step including locating a hide-entry with a source address matching the source address of said datagram; and translating said datagram source address to said rhs address-entry and entering to said rhs port a port selected from a pool of available ports;

with respect to inbound datagrams, said processing step comprising the steps of:
finding a matching conversation based upon the datagram destination address and datagram destination port; and
translating said datagram destination address and datagram destination port; and sending said datagram.

7. An address management system, comprising:
means for selectively masquerading subsets of private addresses among a plurality of public addresses associated with a single gateway system in accordance with a plurality of masquerade rules, each said subset including two or more addresses; and
means for processing at said gateway system incoming and outgoing datagrams with respect to said masquerade rules.

8. An address management system, comprising
a rule compiler for associating a plurality of subsets of two or more private addresses with two or more public names associated with a single gateway system, and for specifying a plurality of masquerade rules for hiding said subsets of addresses behind said public names; and
a NAT interpreter for processing at said gateway system datagrams with respect to said masquerade rules.

9. An address management system, comprising:
a rule compiler for processing ADDRESS statements and HIDE rule statements to generate a file of masquerade rules; said ADDRESS statements including an address name and one or more associated addresses and said HIDE statements including a left hand side (lhs) address-entry and a right hand side (rha) address-entry; said rhs address-entry being a public address name and said lhs address entry being a set of private addresses; and
a network address translation (NAT) interpreter operable responsive to said masquerade rules for performing network address translation for each IP datagram;

said rule compiler:
for each ADDRESS statement, creating a new address-entry with said public address name and said associated private addresses in a rules file; and
for each HIDE statement, creating a hide-entry including said rhs address-entry and said lhs address-entry in a symbol file;

each said datagram including a source address, a source port, a destination address and a destination port;

with respect to outbound datagrams, said NAT interpreter:
selectively creating a conversation or finding a conversation, said conversation including a source address, a source port and an associated rhs address-entry and rhs port;
for finding, said NAT interpreter matching the source address and source port of said datagram with the source address and source port of said conversation;
for creating, said NAT interpreter locating a hide-entry with a source address matching the source address of said datagram; and translating said datagram source address to said rhs address-entry and entering to said rhs port a port selected from a pool of available ports;

with respect to inbound datagrams, said NAT interpreter:
finding a matching conversation based upon the datagram destination address and datagram destination port; and
translating said datagram destination address and datagram destination port; and means for sending said datagram.

10. A program storage device readable by a machine, tangibly embodying a program of instructions executable by a machine to perform method steps for managing addresses, said method steps comprising:
processing ADDRESS statements and HIDE rule statements to generate a file of masquerade rules for associating subsets of internal addresses among a plurality of public addresses on a single physical interface, each said subset including entries of two or more addresses; and
responsive to said masquerade rules, performing network address translation for incoming and outgoing IP datagrams.

11. An article of manufacture comprising:
a computer useable medium having computer readable program code means embodied therein for managing addresses, the computer readable program means in said article of manufacture comprising:
computer readable program code means for causing a computer to effect processing ADDRESS statements and HIDE rule statements to generate a file of masquerade rules for associating subsets including two or more entries of internal addresses among a plurality of public addresses on a single physical interface; and
computer readable program code means for causing a computer to effect responsive to said masquerade rules, performing network address translation for incoming and outgoing IP datagrams.

12. An address management method, comprising the steps of:

processing ADDRESS statements and HIDE rule statements to generate a file of masquerade rules for associating subsets of internal addresses among a plurality of public addresses, each said subset including two or more public address entries;

responsive to said masquerade rules, performing network address translation for incoming and outgoing IP datagrams;

said ADDRESS statements including a public address name and one or more associated private addresses and said HIDE statements including a left hand side (lhs) address-entry and a right hand side (rhs) address-entry, said processing step further including:

for each ADDRESS statement, creating a new address-entry with said public address name and said associated private addresses in a rules file; and for each HIDE statement, creating a hide-entry including said rhs address-entry and said lhs address-entry in a symbol file, said rhs address-entry being a public address name and said lhs address entry being a set of private addresses.

13. The address management method of claim 12, each said datagram including a source address and a destination address, said performing step comprising the steps of:

selectively creating a conversation or finding a conversation, said conversation including a source address and an associated rhs address-entry;

said finding step including matching the source address of said datagram with the source address of said conversation;

said creating step including locating a hide-entry with a source address matching the source address of said datagram; and translating said datagram source address to said rhs address-entry.

* * * * *

UNITED STATES PATENT AND TRADEMARK OFFICE
CERTIFICATE OF CORRECTION

PATENT NO.    : 6,717,949 B1
DATED         : April 6, 2004
INVENTOR(S)   : Edward B. Boden et al.

Page 1 of 2

It is certified that error appears in the above-identified patent and that said Letters Patent is hereby corrected as shown below:

Column 9,
Line 7, "public" should be -- internal --.

Column 10,
Line 18, add the following claims:

```
14.   An address management method, comprising the steps of:

processing ADDRESS statements and HIDE rule statements to
      generate a file of masquerade rules for associating subsets of
      internal address among a plurality of public addresses on a
      single physical interface;

wherein said ADDRESS statements include a public address name
      and one or more associated private addresses and wherein said
      HIDE statements include a left hand side (lhs) address-entry
      and a right hand side (rhs) address-entry;

said processing step further comprising:

for each ADDRESS statement, creating a new address-entry
            with said public address name and said associated private
            addresses in a rules file; and for each HIDE statement, creating a hide-entry including
            said rhs address-entry and said lhs address-entry in a
            symbol file, said rhs address-entry being a public
            address name and said lhs address entry being a set of
            private addresses; and responsive to said masquerade rules, performing network
            address translation for incoming and outgoing IP
            datagrams.
```

UNITED STATES PATENT AND TRADEMARK OFFICE
CERTIFICATE OF CORRECTION

PATENT NO. : 6,717,949 B1
DATED : April 6, 2004
INVENTOR(S) : Edward B. Boden et al.

It is certified that error appears in the above-identified patent and that said Letters Patent is hereby corrected as shown below:

Column 10 (cont'd),

```
15.  The address management method of claim 14, each said datagram
including a source address and a destination address, said performing
step comprising the steps of:

selectively creating a conversation or finding a conversation,
     said conversation including a source address and an associated
     rhs address-entry;

said finding step including matching the source address of said
     datagram with the source address of said conversation;

said creating step including locating a hide-entry with a
     source address matching the source address of said datagram;
     and translating said datagram source address to said rhs
     address-entry.
```

Signed and Sealed this

Tenth Day of August, 2004

JON W. DUDAS
*Acting Director of the United States Patent and Trademark Office*